(12) United States Patent
Meyer

(10) Patent No.: US 10,371,167 B2
(45) Date of Patent: Aug. 6, 2019

(54) THRUST BEARING BASE FOR AN ELECTRICAL SUBMERSIBLE WELL PUMP HAVING AN INTEGRATED HEAT EXCHANGER

(71) Applicant: Baker Hughes, Houston, TX (US)

(72) Inventor: Aron Meyer, Pryor, OK (US)

(73) Assignee: Baker Hughes, a GE Company. LLC, Houston, TX (US)

( * ) Notice: Subject to any disclaimer, the term of this patent is extended or adjusted under 35 U.S.C. 154(b) by 145 days.

(21) Appl. No.: 15/498,596

(22) Filed: Apr. 27, 2017

(65) Prior Publication Data
US 2018/0313359 A1 Nov. 1, 2018

(51) Int. Cl.
*F01M 1/10* (2006.01)
*F04D 1/06* (2006.01)
(Continued)

(52) U.S. Cl.
CPC ........ *F04D 29/5866* (2013.01); *E21B 43/128* (2013.01); *F01M 1/10* (2013.01); *F04D 13/06* (2013.01); *F04D 13/10* (2013.01); *F04D 29/0413* (2013.01); *E21B 4/003* (2013.01); *F04D 1/06* (2013.01); *F04D 29/061* (2013.01);
(Continued)

(58) Field of Classification Search
CPC . F04D 29/06; F04D 13/10; F04D 1/06; F04D 29/0413; F04D 1/00; F04D 29/007; F04D 29/041; F04D 29/128; F04D 29/406; F04D 29/586; F04D 29/5866; F04D 13/062; F04D 13/0653; F04D 13/08; F04D 13/086; F04D 29/7029
See application file for complete search history.

(56) References Cited

U.S. PATENT DOCUMENTS 4,557,323 A * 12/1985 Hardy ..................... F28D 7/028
122/18.4
6,025,643 A * 2/2000 Auger ................. H01L 23/3677
257/667
(Continued)

FOREIGN PATENT DOCUMENTS

JP 2004-132187 A 4/2004

OTHER PUBLICATIONS

Related U.S. Appl. No. 15/420,336, filed Jan. 31, 2017.
International Search Report and Written Opinion dated Jul. 23, 2018 for corresponding PCT/US2018/026284.

*Primary Examiner* — Bryan M Lettman
*Assistant Examiner* — Timothy P Solak
(74) *Attorney, Agent, or Firm* — Bracewell LLP; James E. Bradley

(57) ABSTRACT

A submersible well pump is driven by an electrical motor. A thrust bearing module between the pump and the motor has a base secured to and extending downward from a housing. The base has a motor end connector and an axial bore in fluid communication with lubricant in the motor. A shaft extends through the bore and into the housing. A thrust bearing assembly has a lower end at an upper end of the base. A lubricant pump mounted in the bore and coupled to the shaft pumps lubricant upward into the chamber. A passage has an inlet port in the chamber and an outlet port within the bore for returning lubricant pumped by the lubricant pump. The passage extends internally through the base and has a number of turns encircling the bore.

19 Claims, 3 Drawing Sheets

(51) Int. Cl.
  *E21B 43/12*    (2006.01)
  *F04D 13/06*    (2006.01)
  *F04D 13/10*    (2006.01)
  *F04D 29/58*    (2006.01)
  *F04D 29/041*   (2006.01)
  *E21B 4/00*     (2006.01)
  *F04D 29/06*    (2006.01)
  *F16N 13/20*    (2006.01)
  *F16N 17/00*    (2006.01)

(52) U.S. Cl.
  CPC .......... *F05D 2250/51* (2013.01); *F16N 13/20* (2013.01); *F16N 17/00* (2013.01); *F16N 2210/28* (2013.01)

(56) References Cited

U.S. PATENT DOCUMENTS

| | | |
|---|---|---|
| 7,987,913 B2 | 8/2011 | Parmeter et al. |
| 8,845,308 B2 | 9/2014 | Tetzlaff et al. |
| 2007/0277969 A1 | 12/2007 | Hall et al. |
| 2009/0010773 A1 | 1/2009 | Parmeter et al. |
| 2012/0263610 A1* | 10/2012 | Tetzlaff ............... F04D 29/0476 417/410.1 |
| 2015/0064032 A1* | 3/2015 | Sadana ............... F04D 29/5806 417/423.3 |
| 2015/0354582 A1* | 12/2015 | Tanner ................... F04D 13/08 415/1 |
| 2017/0030171 A1 | 2/2017 | Collins |
| 2017/0037861 A1 | 2/2017 | Rutter et al. |

* cited by examiner

THRUST BEARING BASE FOR AN ELECTRICAL SUBMERSIBLE WELL PUMP HAVING AN INTEGRATED HEAT EXCHANGER

FIELD OF THE DISCLOSURE

This disclosure relates in general to electrical submersible well pumps, and in particular to a pump shaft thrust bearing module having a base with internal helical motor lubricant circulation passage.

BACKGROUND

Electrical submersible well pumps (ESP) are often used to pump liquids from hydrocarbon producing wells. A typical ESP includes a pump driven by an electrical motor. A seal section connects between the pump and the motor to seal the drive shaft extending from the motor. The seal section may have pressure equalizing components to equalize the pressure of the lubricant in the motor with the pressure of the well fluid on the exterior. A thrust bearing module is at the lower end of the seal section for absorbing thrust imposed on the pump shaft.

The thrust bearing module has a base that connects to the upper end of the motor. The base has a bore through which the seal section shaft passes. Motor lubricant communicates through the bore in the base, through the thrust bearing assembly, and into the pressure equalizing components of the seal section. In one type of thrust bearing module, a thrust bearing retainer is located on top of the base, and the thrust bearing down thrust bearing is mounted on top of the thrust bearing retainer. A lubricant pump comprising a sleeve with a helical groove on its exterior is located in the bore in the retainer for pumping motor lubricant into the thrust bearing assembly. The motor lubricant circulates back around the outer diameter of the thrust bearing retainer to the lubricant pump.

SUMMARY

A submersible well pump assembly includes a pump driven by an electrical motor. A thrust bearing module that connects to an upper end of the motor has a housing having a longitudinal axis. A base is secured to and extends downward from a lower portion of the housing. The base has an axial bore in fluid communication with lubricant in the motor. The base has a motor end connector below the housing for connecting the thrust bearing module to the motor. A shaft extends through the bore and into the housing. A thrust bearing assembly is located in the housing on an upper end of the base for absorbing thrust imposed on the shaft. A lubricant pump in the bore is coupled to the shaft for rotation therewith for pumping lubricant upward to the thrust bearing assembly. A passage has an upper port at the upper end of the base and a lower port within the bore for circulating lubricant pumped by the lubricant pump. The passage extends internally through the base between the bore and an outer surface of the base and has a plurality of turns encircling the bore.

At least one of the turns is located at a different distance from the axis than at least one other of the turns. In the embodiment shown, the turns of the passage have a helical configuration. More particularly, the turns of the passage have a conic helical configuration with each of the turns in a downward direction being closer to the axis. The turns of the passage spiral downward at decreasing distances from the axis from the upper end of the base to the bore.

In the embodiment shown, the lower portion of the housing has internal threads, and an upper portion of the base has external threads that engage the internal threads. The bore has a lower portion of greater inner diameter than an adjoining upper portion of the bore. The lower port of the passage is in the lower portion of the bore.

In the embodiment shown, the bore has a lower portion of greater inner diameter than an adjoining upper portion of the bore. The passage has more than one of the turns in the upper portion of the base and at least one of the turns in the lower portion of the base.

In the example shown, the lubricant pump discharges lubricant upward through an annular clearance between the shaft and a side wall of the bore. The passage returns lubricant from the thrust bearing assembly to the bore.

The base may have a neck extending downward from an upper portion of the base, the neck having a smaller outer diameter than the upper portion of the base. In the embodiment shown, a plurality of the turns of the passage are located in the upper portion of the base. At least one of the turns of the passage is located in the neck.

The lubricant pump may comprise a sleeve having a helical groove on an outer surface of the sleeve. The sleeve has an upper portion located within the upper portion of the bore and a lower portion within the lower portion of the bore. The lower port of the passage is in the lower portion of the bore below the sleeve.

DETAILED DESCRIPTION OF THE DISCLOSURE

Figure 1:
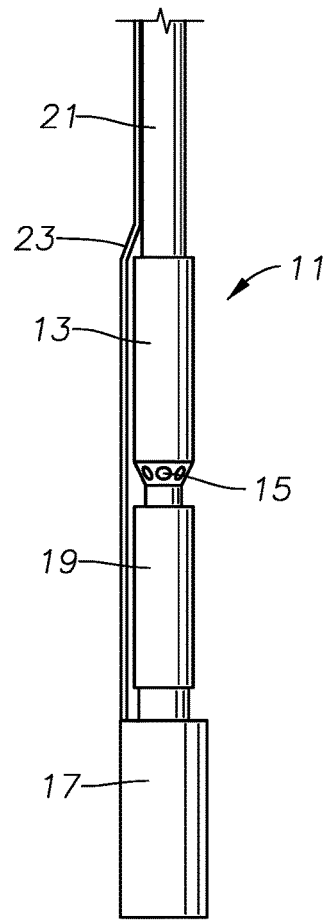
FIG. 1 is a side view of an electrical submersible pump having a seal section in accordance with this invention.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper" and "lower" are used only for convenience as the well pump may operate in positions other than vertical, including in horizontal sections of a well.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, electrical submersible pump assembly 11 includes a pump 13 that may be a centrifugal pump with a large number of stages, each stage having an impeller and a diffuser. Alternately, pump 13 could be another type. Pump 13 has an intake 15 for drawing in well fluid. A motor 17, normally a three-phase electrical motor, drives pump 13. A seal section 19 secures to the upper end of motor 17. Seal section 19 may have pressure equalizing components to reduce a pressure differential between lubricant in motor 17 and the well fluid. Alternately, the pressure equalizing components could be located below motor 17.

A string of production tubing 21 secures to the upper end of pump 13 and supports ESP 11 in a well. Pump 13 discharges into production tubing 21 to convey well fluid to the surface. A motor lead 23 extends from motor 17 alongside seal section 19, pump 13 and production tubing 21. Motor lead 23 secures to a power cable (not shown) to supply electrical power to motor 17.

Figure 2A:
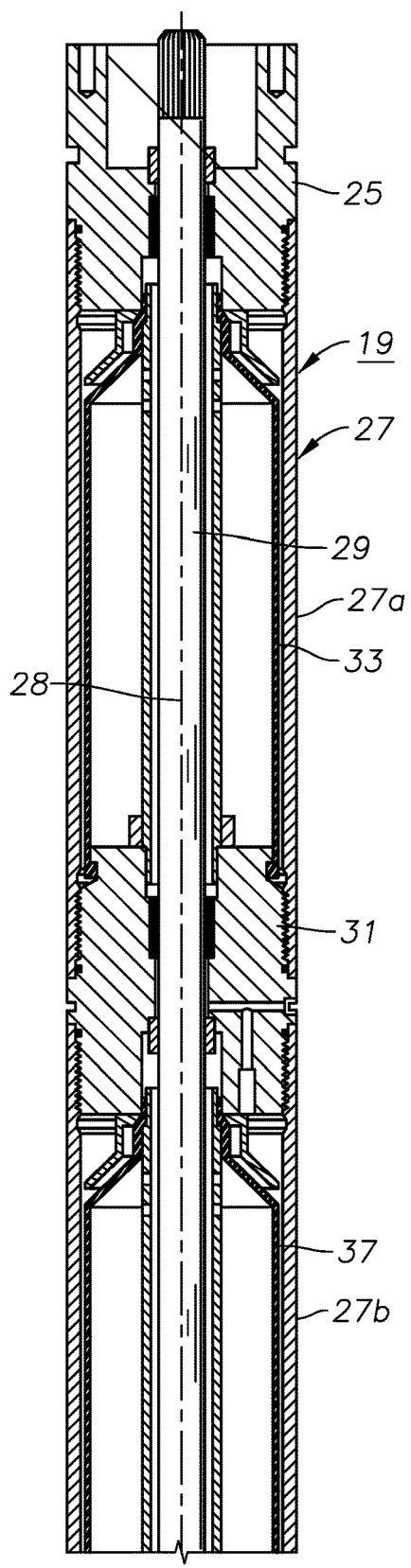
FIGS. 2A and 2B comprise a sectional view of the seal section of the pump of FIG. 1.

Referring to FIG. 2A, seal section 19 has a head or adapter 25 that secures to pump intake 15. A tubular housing 27 having a longitudinal axis 28 secures to head 25. Housing 27 has multiple sections 27a, 27b, 27c and 27d in this example, but it could have fewer sections or even be a single component. A rotatable drive shaft 29 extends through housing 27 and has an upper end at head 25. The upper end of drive shaft 29 has a splined end that connects to a drive shaft in pump 13; the lower end of drive shaft 29 has a splined end that connects to a drive shaft in motor 17. An upper guide member or connector member 31 secures to the lower end of the uppermost or first section 27a of housing 27.

Figure 2B:
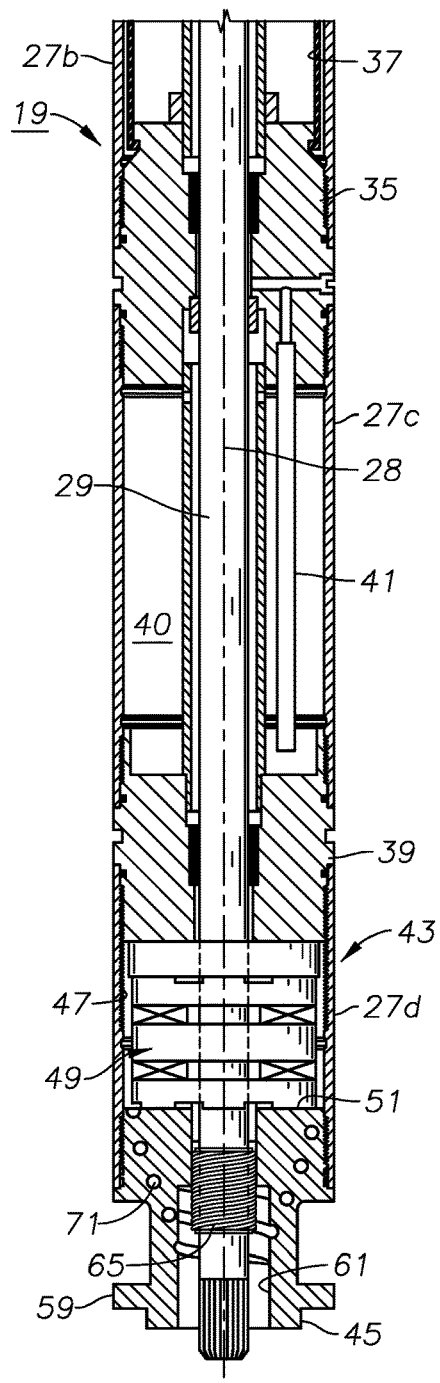

An upper pressure equalizer 33, which in this example comprises a flexible elastomeric bag, fits within first housing section 27a. Second housing section 27b secures to upper guide member 31 and to a second or intermediate guide member 35 (FIG. 2B). A lower pressure equalizer 37, which in this example, comprises another flexible elastomeric bag, fits within second housing section 27b. Third housing section 27c secures between intermediate guide member 35 and a lower guide member 39. The space in third housing section 27c comprises a labyrinth chamber 40 with a labyrinth tube 41. Many variations of seal section 19 are feasible, including having only a single pressure equalizer, rather than two, and eliminating the labyrinth chamber. Also, the pressure equalizing elastomeric bags 33, 37 could be metal bellows.

Fourth housing section 27d comprises a thrust bearing module 43. A base 45 secures to the lower end of fourth housing section 27d. The space between base 45 and lower guide member 39 defines a thrust bearing chamber 47 containing a thrust bearing assembly 49. Thrust bearing assembly 49 transfers down thrust imposed on shaft 29 from the shaft in pump 13 (FIG. 1) to base 45. Thrust bearing assembly 49 may also transfer up thrust imposed on the shaft in pump 13 to lower guide member 39. Although shown as a lower part of seal section 19, thrust bearing module 43 could be a separate unit from seal section 19 and have a separate shaft.

Figure 3:
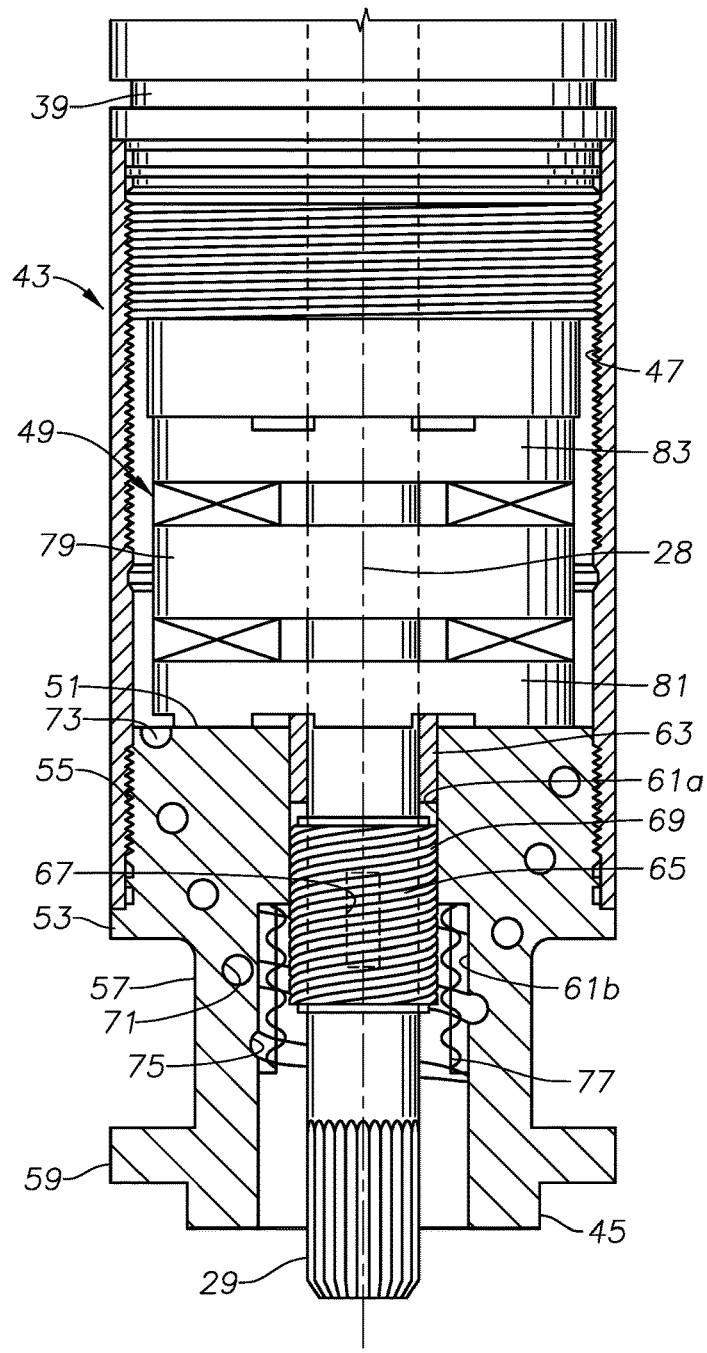
FIG. 3 is an enlarged sectional view of the base and thrust bearing assembly of the seal section of FIG. 2B.

Referring to FIG. 3, base 45 has an upper end 51 that may be in a plane perpendicular to axis 28. Base 45 has an upper portion 53 extending downward from upper end 51. Upper portion 53 has a cylindrical outer diameter with external threads 55 that secure to internal threads in the lower end portion of fourth housing section 27d. Base 45 has a neck 57 extending below fourth housing section 27d. Neck 57 has a lesser outer diameter than the outer diameter of base upper portion 53 in this example. Base 45 has a motor connector 59 on the exterior of neck 57, and in this example, motor end connector 59 is an external flange having holes (not shown) for receiving bolts to bolt base 45 to motor 17 (FIG. 1). Alternately, the motor connection components could be a threaded rotatable collar type (not shown).

A bore 61 extends through base 45 concentric with axis 28. Bore 61 optionally may have an upper portion 61a and a larger diameter lower portion 61b of larger diameter. Bore upper portion 61a extends downward from base upper end 51 approximately to neck 57. Bore lower portion 61b joins bore upper portion 61a and extends downward in neck 57 to the lower end of base 45. A non rotating bushing 63 in bore upper portion 61a slidably receives shaft 29.

Bore 61 is in fluid communication with motor lubricant in motor 17 (FIG. 1). A lubricant pump 65 may be employed to circulate motor lubricant through thrust bearing assembly 49 for lubrication and cooling. In this embodiment, lubricant pump 65 comprises a sleeve through which shaft 29 extends. A key (not shown) engages a keyway 67 in the inner diameter of lubricant pump 65 and a groove (not shown) on shaft 29 to cause lubricant pump 65 to rotate with shaft 29. Lubricant pump 65 has helical grooves 69 on its outer diameter that are closely received by bore upper portion 61a. The rotation of lubricant pump 65 pumps motor lubricant up helical grooves 69 and past bushing 63 into thrust bearing chamber 47.

A passage 71 returns to bore lower portion 61b lubricant pumped into thrust bearing chamber 47 by lubricant pump 65. Passage 71 is an internal passageway within base 45, having an upper port 73 on base upper end 51 and a lower port 75 within bore lower portion 61b. Upper port 73 is located near the outer diameter of base upper portion 53. Lower port 75 intersects the side wall of bore lower portion 61b below the lower end of lubricant pump 65. More than one passage 71 could be employed. The transverse cross-sectional shape of passage 71 is shown as circular, but it could have other shapes.

Passage 71 has a number of turns encircling shaft 29. Each of the turns of passage 71 is radially inward from the outer surface of base 45 and radially outward from bore 61. The turns of passage 71 define a helical configuration. In this example, the turns of passage 71 define a conic helical configuration. That is, each turn in a downward direction is closer to axis 28 than the turn immediately above. Passage 71 makes several 360 degree turns in base upper portion 53 and at least one 360 degree turn in neck 57. Passage 71 defines a spiral return flow path for motor lubricant pumped by lubricant pump 65 from thrust bearing chamber 47 to bore lower portion 61b.

A filter or screen 77 may be located in this return flow path to filter debris from the motor lubricant. In this example, screen 77 is a cylindrical member located in bore lower portion 61b over passage lower port 75. Alternately, screen 77 could be located over upper port 73. Passage 71 could have debris catches (not shown) along the spiral path.

Base 45 is preferably formed by additive manufacturing so as to be able to form passage 71 in its internal conic helical configuration. Base 45 is formed of a good heat conductive material so draw heat from the returning motor lubricant in passage 71.

Thrust bearing assembly 49 may be conventional, having a thrust runner 79 secured to shaft 29. Thrust runner 79 locates above and slidingly engages a non rotating down thrust bearing 81 to transfer downward force imposed on shaft 29 to down thrust bearing 81. Down thrust bearing 81 may be a separate component mounted on base upper end 51, as shown. One or more anti-rotation pins (not shown) extend from base upper end 51 into holes in down thrust bearing 81 to prevent rotation of down thrust bearing 81.

Alternately, down thrust bearing 81 could be an integral part of base upper end 51. A non rotating up thrust bearing 83 may be mounted above runner 79 to receive up thrust imposed on shaft 29.

In operation, seal section 19 operates conventionally. In this example, prior to installation, motor lubricant will be introduced into upper bag 33, lower bag 37 and labyrinth chamber 40. Motor lubricant in upper bag 33, lower bag 37 and labyrinth chamber 40 communicates with motor lubricant in motor 17 via annular passages around shaft 29. Upper bag 33 and lower bag 37 are in series. The lubricant in upper bag 33 is separated from the lubricant in lower bag 37. While in the well, well fluid will flow through a port into the space around upper bag 33, increasing the lubricant pressure in upper bag 33 to equal the well fluid pressure. The lubricant throughout seal section 19 and motor 17 will increase in temperature due to well temperatures and operation of motor 17. When the lubricant in lower bag 37 expands beyond its capacity due to the increased temperature, a check valve opens and releases lubricant into upper bag 33. When upper bag 33 expands beyond its capacity, a check for valve for upper bag 33 releases lubricant into the well fluid. Bags 33, 37 contract and expand to reduce a pressure differential between the motor lubricant in motor 17 and well fluid in the well.

Lubricant pump 65 circulates lubricant to thrust bearing chamber 47, which lubricates and cools thrust bearing assembly 49. Motor lubricant returns to base bore lower portion 61b via passage 71. The lubricant exchanges heat with base 45, which is immersed in well fluid and at a cooler temperature. Base thus serves as a heat exchanger.

The present invention described herein, therefore, is well adapted to carry out the objects and attain the ends and advantages mentioned, as well as others inherent therein. A thrust bearing retainer as used in the prior art is not required. The thrust bearing assembly may rest directly on the base. The distance from the lower end of the base to the thrust bearing assembly is shorter than the prior art type using a thrust bearing retainer. The shorter distance may reduce vibration.

While only a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. For example, tandem seal sections, each having a separate shaft and base, could be employed. Each of the seal sections could have a heat exchanger base as described.

The invention claimed is:

1. A submersible well pump assembly, comprising:
a pump driven by an electrical motor;
a thrust bearing module at an upper end of the motor, comprising:
a housing having a longitudinal axis;
a base rigidly secured to and extending downward from a lower portion of the housing, the base being a single-piece body having an outer surface and a lower portion, the lower portion of the base extending below the lower portion of the housing for immersion in well fluid, the base having an axial bore in fluid communication with lubricant in the motor, the base having a motor end connector below the housing for connecting the thrust bearing module to the motor;
a shaft extending through the bore and into the housing;
a thrust bearing assembly located in the housing on an upper end of the base for transferring down thrust imposed on the shaft to the base, which in turn transfers the down thrust to the housing;
a lubricant pump mounted in the bore and coupled to the shaft for rotation therewith for pumping lubricant upward to the thrust bearing assembly; and
a passage having an upper port at the upper end of the base and a lower port within the bore below the lower portion of the housing for circulating lubricant pumped by the lubricant pump, the passage extending internally within the body of the base between the bore and the outer surface of the base and having a plurality of turns encircling the bore, each of the turns being spaced radially inward from the outer surface of the base.

2. The well pump assembly according to claim 1, wherein:
at least one of the turns is located radially inward from the outer surface in the lower portion of the base.

3. The well pump assembly according to claim 1, wherein the passage is fully enclosed by the body of the base.

4. The well pump assembly according to claim 1, wherein the turns of the passage have a conic helical configuration with each of the turns in a downward direction being closer to the axis.

5. The well pump assembly according to claim 1, wherein:
the turns of the passage spiral downward at decreasing distances from the axis from the upper end of the base to the bore.

6. The well pump assembly according to claim 1, wherein:
the lower portion of the housing has internal threads, and an upper portion of the base has external threads that engage the internal threads;
at least one of the turns of the passage is located radially inward from the external threads of the base;
the bore has a lower portion of greater inner diameter than an adjoining upper portion of the bore; and
the lower port of the passage is in the lower portion of the bore.

7. The well pump assembly according to claim 1, wherein:
the lower portion of the housing has internal threads, and an upper portion of the base has external threads that engage the internal threads;
the bore has a lower portion of greater inner diameter than an adjoining upper portion of the bore;
the passage has more than one of the turns in the upper portion of the base and at least one of the turns in the lower portion of the base; and
the lower port of the passage is in the lower portion of the bore.

8. The well pump assembly according to claim 1, wherein:
the lubricant pump discharges lubricant upward through an annular clearance between the shaft and a side wall of the bore; and
the passage returns lubricant from the thrust bearing assembly to the bore.

9. The well pump assembly according to claim 1, wherein:
the housing has a lower portion with internal threads;
the base has an upper portion with external threads that secure to the internal threads;
the base has a neck extending downward from the upper portion of the base, the neck having a smaller outer diameter than the upper portion of the base;
a plurality of the turns of the passage are located in the upper portion of the base; and
at least one of the turns of the passage is located in the neck.

10. The well pump assembly according to claim 1, wherein:
the bore has a lower portion of greater inner diameter than an adjoining upper portion of the bore;
the lubricant pump comprises a sleeve having a helical groove on an outer surface of the sleeve, the sleeve having an upper portion located within the upper portion of the bore and a lower portion within the lower portion of the bore; and
the lower port of the passage is in the lower portion of the bore below the sleeve.

11. A submersible well pump assembly, comprising:
a pump driven by an electrical motor;
a thrust bearing module between the pump and the motor, comprising:
a housing having a longitudinal axis;
a base secured to and extending downward from a lower portion of the housing, the base having an axial bore in fluid communication with lubricant in the motor, the base having a motor end connector below the housing for connecting the thrust bearing module to the motor;
a shaft extending through the bore and into the housing;
a thrust bearing assembly for absorbing thrust on the shaft, the thrust bearing assembly being located in a chamber in the housing, the chamber having a lower end at an upper end of the base;
a lubricant pump mounted in the bore and coupled to the shaft for rotation therewith for pumping lubricant upward in an annular clearance between the shaft and a side wall of the bore into the chamber;
a passage having an inlet port in the chamber and an outlet port within the bore for returning lubricant pumped by the lubricant pump from the chamber, the passage extending internally through the base between the bore and an outer surface of the base and having a plurality of turns encircling the bore; wherein
the lower portion of the housing has internal threads, and an upper portion of the base has external threads that engage the internal threads;
the base has a neck extending downward from the upper portion of the base, the neck having a smaller outer diameter than the upper portion of the base;
a plurality of the turns of the passage are located in the upper portion of the base; and
at least one of the turns of the passage is located in the neck.

12. The pump assembly according to claim 11, wherein the turns of the passage have a helical configuration.

13. The pump assembly according to claim 11, wherein the turns of the passage have a conic helical configuration, each of the turns decreasing in a distance from the axis in a downward direction.

14. The well pump assembly according to claim 11, wherein:
the bore has a lower portion of greater inner diameter than an adjoining upper portion of the bore;
the lubricant pump comprises a sleeve secured to the shaft for rotation therewith, the sleeve having a helical groove on an outer surface of the sleeve, the sleeve having an upper portion located within the upper portion of the bore and a lower portion within the lower portion of the bore; and
the lower port of the passage is in the lower portion of the bore below the sleeve.

15. The well pump assembly according to claim 11, wherein:
a return flow path extends from the chamber through the passage to the bore; and the well pump assembly further comprises:
a screen within the return flow path for filtering debris from the lubricant.

16. A submersible well pump assembly, comprising:
a pump driven by an electrical motor;
a thrust bearing module between the pump and the motor, comprising:
a housing having a longitudinal axis and a lower end portion with internal threads;
a thrust bearing chamber in the housing;
a base defining a lower end of the thrust bearing chamber, the base having an upper portion with external threads secured to the internal threads of the housing, the base having a neck portion extending downward from the upper portion, the neck portion having a smaller diameter than the upper portion of the base and extending downward from the lower portion of the housing, the base having an axial bore in fluid communication with lubricant in the motor, the base having a motor end connector on the neck portion for connecting the thrust bearing module to the motor;
a shaft extending through the bore and into the housing;
a thrust bearing assembly for absorbing thrust on the shaft, the thrust bearing assembly being located in the thrust bearing chamber;
a lubricant pump mounted in the bore and coupled to the shaft for rotation therewith for pumping lubricant upward in an annular clearance between the shaft and a side wall of the bore into the thrust bearing chamber;
a passage having an inlet port in the chamber and an outlet port within the bore for returning lubricant from the thrust bearing chamber to the bore, the passage extending internally through the base and having a plurality of turns encircling the bore in the upper portion of the base and at least one turn encircling the bore in the neck portion of the base; and wherein
the turns of the passage define a conic helical configuration, decreasing in diameter in a downward direction.

17. The well pump assembly according to claim 16, wherein:
the bore has a lower portion of greater inner diameter than an adjoining upper portion of the bore;
the lubricant pump comprises a sleeve having a helical groove on an outer surface of the sleeve, the sleeve having an upper portion located within the upper portion of the bore and a lower portion within the lower portion of the bore; and
the lower port of the passage is in the lower portion of the bore below the sleeve.

18. The well pump assembly according to claim 16, wherein:
a return flow path extends from the thrust bearing chamber through the passage to the bore; and the well pump assembly further comprises:
a screen within the return flow path for filtering debris from the lubricant.

19. The well pump assembly according to claim 16, wherein the base has an upper end that is located in a plane that defines an upper end of the external threads.

* * * * *